Figure 1:
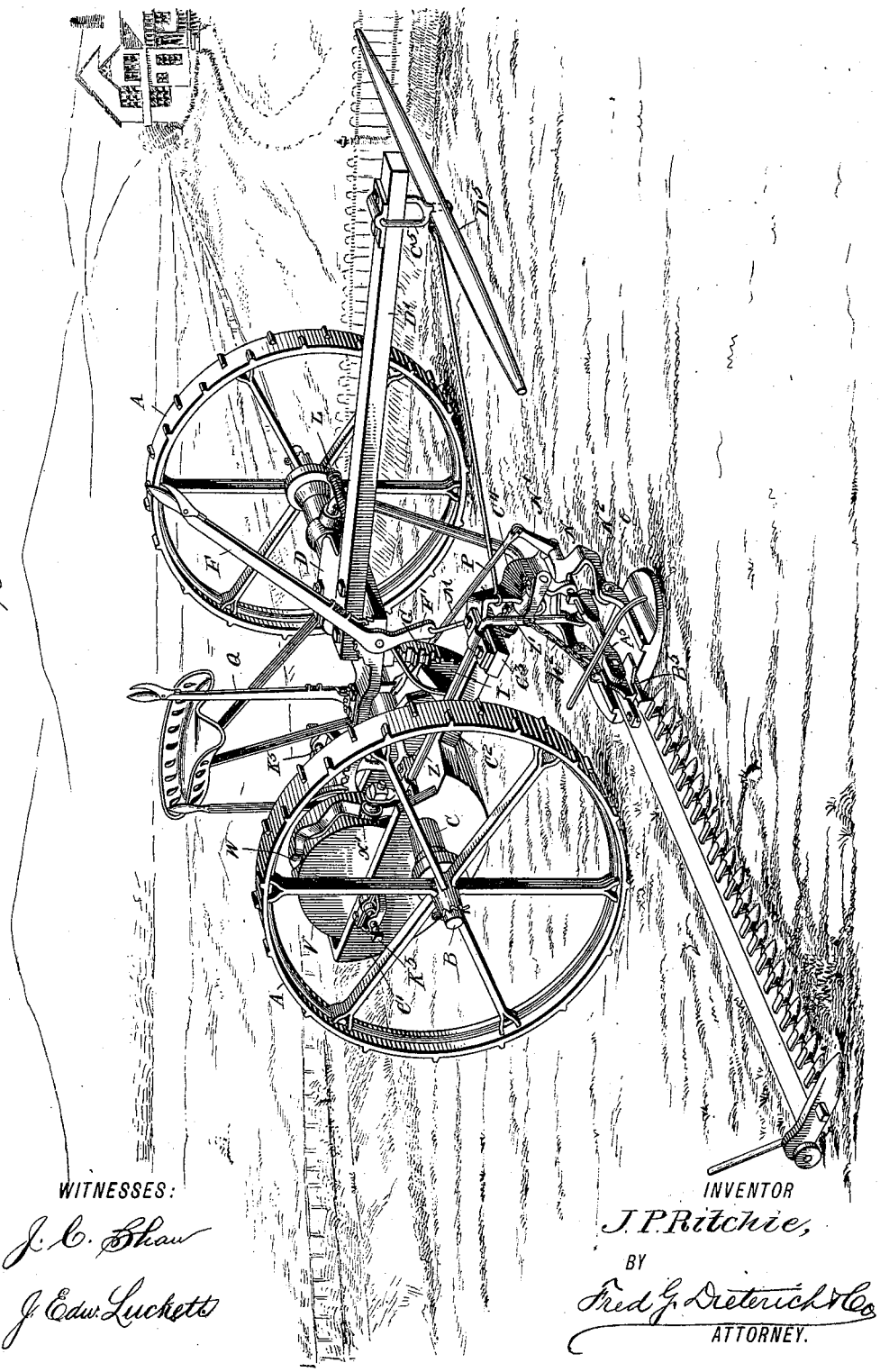

(No Model.)
3 Sheets—Sheet 1.

J. P. RITCHIE.
MOWING MACHINE.

No. 578,087. Patented Mar. 2, 1897.

WITNESSES:
J. C. Shaw
J. Edw. Luckett

INVENTOR
J. P. Ritchie,
BY
Fred G. Dieterich & Co.
ATTORNEY.

(No Model.)  3 Sheets—Sheet 2.
J. P. RITCHIE.
MOWING MACHINE.
No. 578,087.  Patented Mar. 2, 1897.
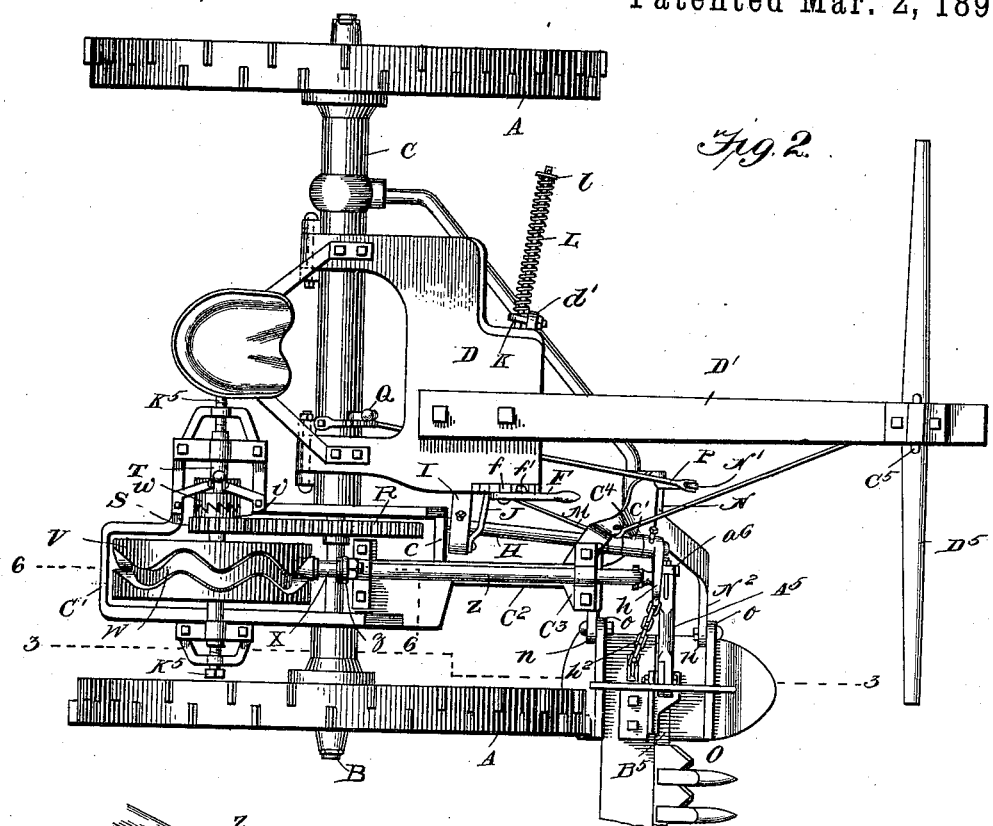
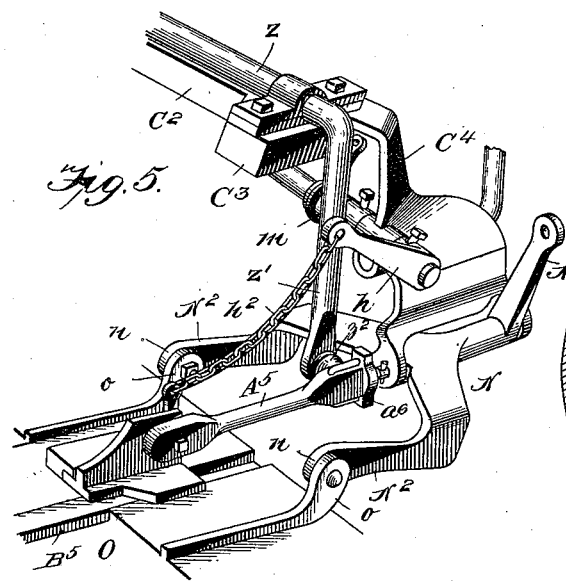
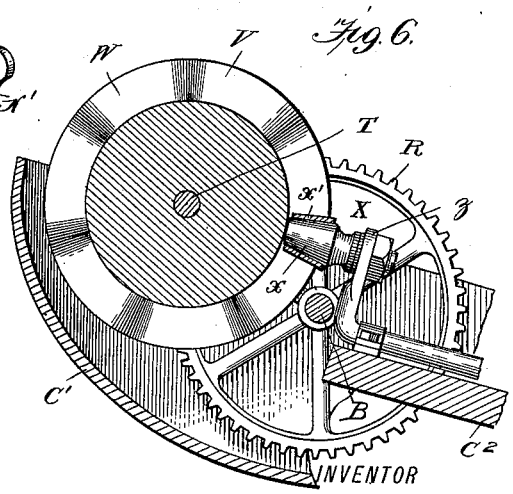
WITNESSES:
J. C. Shaw
J. Edw. Luckett
INVENTOR
J. P. Ritchie,
BY
Fred G. Dieterich & Co.
ATTORNEY.

(No Model.) 3 Sheets—Sheet 3.
J. P. RITCHIE.
MOWING MACHINE.
No. 578,087. Patented Mar. 2, 1897.
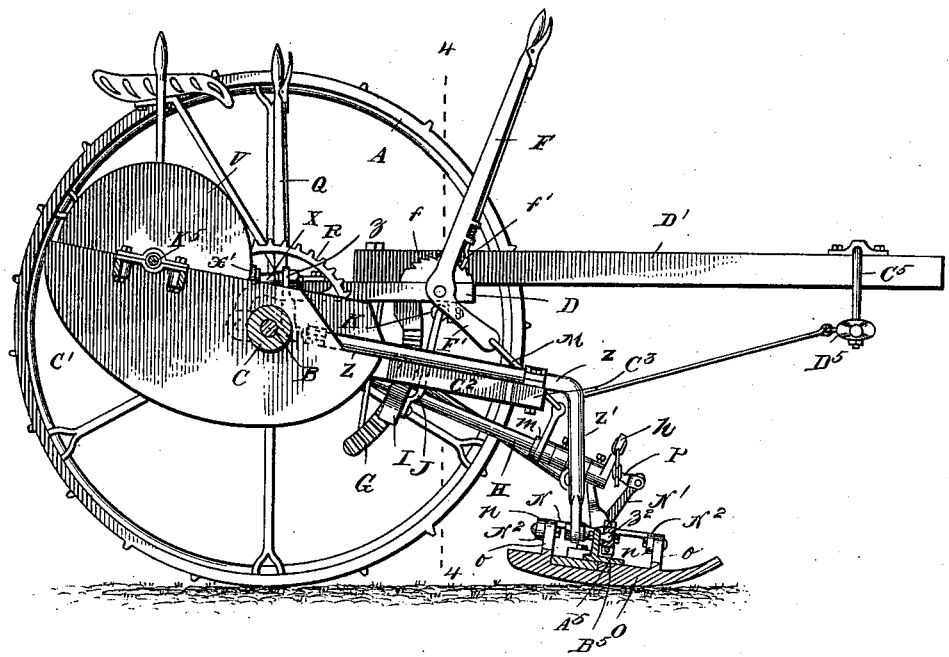
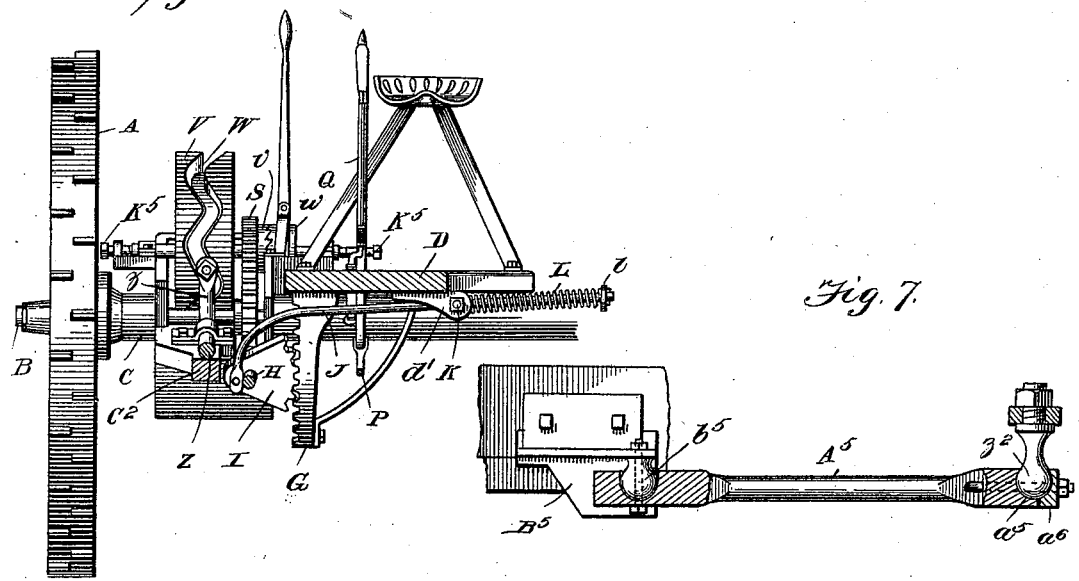
WITNESSES:
J. C. Shaw
J. Edw. Luckett
INVENTOR
J. P. Ritchie,
BY
Fred G. Dieterich & Co.
ATTORNEYS

UNITED STATES PATENT OFFICE.

JAMES PARIS RITCHIE, OF RITCHIE, TENNESSEE.

MOWING-MACHINE.

SPECIFICATION forming part of Letters Patent No. 578,087, dated March 2, 1897.

Application filed December 7, 1895. Serial No. 571,378. (No model.)

*To all whom it may concern:*

Be it known that I, JAMES PARIS RITCHIE, residing at Ritchie, in the county of Claiborne and State of Tennessee, have invented a new and Improved Mowing-Machine, of which the following is a specification.

My invention, which relates to improvements in mowing-machines, primarily has for its object to provide a machine of this character, of a simple and economical construction, which will run freely in any position, especially among trees or stumps, without throwing the gear in or out of position, and in which the adjusting mechanism is conveniently operated from the driver's seat and easily manipulated.

Furthermore, my invention has for its object to provide a machine of this character having a very short pitman, whereby to reduce the danger of breaking, and the cam mechanism and sickle-bar-lever devices operated thereby are so arranged that an almost continuous cutting action of the sickle is obtained.

With other objects in view, which will hereinafter be set forth, the invention consists in the peculiar combination and novel arrangement of parts first described in detail and then specifically pointed out in the appended claims, reference being had to the accompanying drawings, in which—

Figure 1 is a perspective view of my improved mower, the parts being shown in their operative position. Fig. 2 is a top plan view thereof. Fig. 3 is a sectional side elevation taken on the line 3 3 of Fig. 2. Fig. 4 is a partial transverse section taken on the line 4 4 of Fig. 3. Fig. 5 is a detail perspective view of the parts hereinafter specifically referred to. Fig. 6 is a detail section taken on the line 6 6 of Fig. 2. Fig. 7 is a horizontal section of the pitman connections.

Referring to the accompanying drawings, in which the same letters of reference indicate like parts in all the figures, A A indicate the drive or supporting wheels, which are mounted on the axle B, upon which is held the main frame, which comprises a sleeve-like portion C, held on the axle, a rearwardly-extending portion C', a forwardly-extending portion $C^2$, which terminates in a pendent portion $C^3$, the particular construction and purpose of which will presently be fully set forth.

D indicates the tongue-frame, which is connected to the frame C, as shown, and D' indicates the tongue member secured to the said frame D. This frame D at the sickle side has an upwardly-projecting toothed segment $f$, to which is pivoted an adjusting-lever F, having a hand-released spring-pawl $f'$, which engages the said segment, the lower end of such lever terminating in a crank portion F', for a purpose presently explained.

G indicates a rearwardly-curved rack member projected down from the frame D and having its toothed face on the sickle or mower side.

H indicates a longitudinally-disposed rock-shaft journaled in bearings $c\ c'$ of the frame C $C^2$, on the front end of which is fitted a crank-arm $h$, while upon the rear end is secured a segmental toothed member I, held to engage the toothed rack G, in the manner most clearly shown in Fig. 4.

By referring to the aforesaid figure and Fig. 2 it will be observed that to the lower end of the member I is pivotally secured the curved end of a transversely-extending rod J, which is guided in an eye member K, held secure in a lug $d'$ on the under side of frame D, and such rod, which extends outward from the eye K, has a coil-spring L, held thereon under a normal compression by the keeper $l$, as shown.

The crank member $h$ of the shaft H is connected to the pivoted sickle-frame by means of link members $h^2\ h^2$, as most clearly shown in Fig. 5.

M indicates a link which joins the crank end of the lever F with the shaft H, it being joined to the shaft by a slide-collar $m$, adjustably held thereon.

So far as described it will be observed that when the tongue is out to a straight or pulling position and the lever F is as shown in Fig. 2 the sickle-frame will be down to a horizontal or working position. Now by pulling the lever back, as the tongue is held up, it follows that the sickle-frame, as also the front end $C^2$ of the main frame, will be raised. During this lifting operation of frame $C^2$ and shaft H the toothed gear or segment I, which is securely held in contact with rack G by the spring L, will, as it climbs the rack G, rock the shaft H, and in consequence, through its crank $h$, elevate the sickle-frame as may be desired. By bending the end of the rod J and connecting it to the gear member I in the manner shown the spring L will serve a double purpose. First, it keeps the gears I and G in contact, and, secondly, as the point of connection of the rod J and gear I passes above the horizontal axis of the shaft H its expansible force will assist in lifting the frame C and sickle devices. The links connecting crank $h$ and the finger-bar are so arranged as to be slack when the tongue is raised for mowing to leave both tongue and cutter free to work on all uneven surfaces of ground, and to further make tongue and cutter-bar work easily the arm $h$ may turn slightly on the shaft H.

By referring now more particularly to Fig. 5 it will be seen that the end $C^3$ of frame C has a bifurcated bearing member $C^4$, in which is journaled a rocker-frame N, having its axis parallel with the cutter or sickle frame and which has an outwardly and upwardly extending crank member N' and a bifurcated bearing portion $N^2$, the operated ears $n\ n$ of which pivotally connect the ears $o\ o$ of the finger-bar O, as shown.

P indicates a rod secured at one end to the crank member N' and at the other to the lower end of a lever Q, pivoted to the frame C adjacent the driver's seat and provided with the usual rack-and-pawl devices.

R indicates a master cog-wheel secured to the axle B, which meshes with a small cog-wheel S, held to turn loose on short drive-shaft T, journaled in the section C' of the main frame, it having a clutch-face $v$, with which a clutch member $w$, made fast to the shaft T, is adapted to be moved into engagement by means of a suitable shifting-lever arranged convenient to the driver's seat.

The shaft T carries a large cam-disk V, having a continuous S-shaped or sinuous cam-groove W in its periphery, into which the bearing member X of the sickle-rocker is adapted to project.

The bearing member or crank-pin X, the construction of which is most clearly shown in Fig. 6, comprises a conical or tapering finger $x$, having a roller-washer $x'$, which is adapted to project into the cam-groove W, which groove, it will be noticed, also tapers or decreases, it being, as it were, wedge shape in cross-section. By this construction it will be manifest that the finger can be adjusted outward into the groove to take up wear by adding a washer between the shoulder on crank-pin X and crank member Z, as shown.

Z indicates the sickle rock-shaft, having a crank member $z$, to which the member X is secured, and a crank member Z' at the front end having a ball-bearing portion $z^2$, which seats in a concave or ball-socket $a^5$ in the inner end of the pitman $A^5$, which socket has a detachable clamp portion $a^6$. The outer end of the pitman is connected with the reciprocating cutter $B^5$ by a ball-and-socket joint $b^5$. The climbing cogs or segment I may be so formed as to slip a short distance on the rack G, so as to let the tongue go free to the ground.

The tilting point of the cutter-bar, it will be observed, is in line with the pitman connection, so as to cause such pitman connection to work free and never cramp regardless of what position the cutter-bar is in.

$K^5\ K^5$ indicate set-screws adapted to take up all wear that may be on end of cam-disk shaft. By thus adjusting the said shaft it follows that the cam-disk can always be kept relatively in such a connection with sickle-rocking devices as to keep the reciprocating sickle or cutter members true with the guard-teeth.

$C^5$ indicates a yoke or bail held pendent from the outer end of the tongue, to the lower end of which is pivotally joined the tripletree $D^5$, such connection giving free motion to draft-rod and causing no friction.

From the foregoing description, taken in connection with the accompanying drawings, it is thought the advantages and complete operation will be readily understood. It will be observed that the main frame with the cutter-bar can be raised and the said bar swung upon its pivots by a single movement of one operating-lever. Furthermore, the driving mechanism for the sickle can be easily adjusted so as to keep the movable and stationary knives in a true position.

By arranging the several lever-operated devices as shown the driver can easily control and regulate the sickle devices and operating mechanism either to set the cutter-bar to cut high or low, to lift it and the front supporting-frame to pass over stumps or between other obstructions, and to throw the operating mechanism in or out of gear.

The several parts are of a very simple construction and so arranged that they can readily be repaired in case of wear or breakage.

Having thus described my invention, what I claim, and desire to secure by Letters Patent, is—

1. In a mowing-machine as described, a frame held to swing on the axle, a tongue-frame secured to the axle, a shaft held to rock on the swing-frame, having a crank portion connected with the sickle-frame, said sickle-frame being hinged to the swing-frame, a single operating-lever secured to the tongue-frame, and connected to the swing-frame, and mechanism operated by the rise and fall of the swing-frame adapted to impart a rocking movement to the aforesaid rock-shaft for the purposes described.

2. In a mower as described the combination with the axle, the swing-frame, the sickle, mechanism pivotally joined to the swing-frame, and the tongue-frame, of a rock-shaft journaled on the swing-frame, having a crank member connected to the sickle-carrier, and a spring-actuated mechanism connected to the tongue-frame and the rock-shaft, adapted to exert a rocking force on such rock-shaft when it is elevated, for the purposes specified.

3. In a mower as described the combination with the swinging frame, the tongue-frame having a segmental rack portion, and the finger-bar hinged to the front end of the swinging frame, of the rock-shaft H, having a crank member $h$, connected with the finger-bar, and provided with a segmental gear held to mesh with the rack portion on the tongue-frame, and the lever F, pivoted to the tongue-frame having a crank portion, connected to the swinging frame all arranged substantially as shown and for the purposes described.

4. In a mowing-machine as described, in combination a tongue-frame secured to the drive-axle, a swinging frame hinged thereto, a sickle-carrier pivotally connected to the swinging frame, a rock-shaft journaled on the swinging frame having a crank member connected with the sickle-carrier, and means mounted on the tongue-frame, and connected to the rock-shaft and swinging frame, for rocking the shaft as the swing-frame is raised or lowered as specified.

5. In a mowing-machine as described the combination with the swinging frame, the rock-shaft H, journaled thereon and connected with the sickle mechanism as described, of the tongue-frame having a segmental member G, the segmental gear I, held on the shaft H, the rod J, held to slide on the tongue-frame, having one end connected with the gear I, at a point below its normal axial line, the spring L, and the lever E, connected with the tongue-frame and the shaft H, all arranged substantially in the manner shown and for the purposes described.

JAMES PARIS RITCHIE.

Witnesses:
   L. C. CHANCE,
   P. E. DIVINE.